United States Patent
Hervy et al.

(10) Patent No.: US 9,784,969 B2
(45) Date of Patent: Oct. 10, 2017

(54) HEAD-UP DISPLAY AND METHOD FOR OPERATING IT

(71) Applicant: Johnson Controls Automotive Electronics SAS, Cergy-Pontoise (FR)

(72) Inventors: Sebastien Hervy, Liancourt-Saint-Pierre (FR); Jean-Christophe Joly-Vuillemin, Pontoise (FR); Bernd Ludewig, Weinheim (DE); Ralf Mayer, Bolanden (DE); Patrick Nebout, Saint Cloud (FR)

(73) Assignee: Johnson Controls Automotive Electronics SAS, Cergy-Pontoise (FR)

( * ) Notice: Subject to any disclaimer, the term of this patent is extended or adjusted under 35 U.S.C. 154(b) by 12 days.

(21) Appl. No.: 14/416,489

(22) PCT Filed: Jul. 24, 2013

(86) PCT No.: PCT/EP2013/065584
§ 371 (c)(1),
(2) Date: Jan. 22, 2015

(87) PCT Pub. No.: WO2014/016329
PCT Pub. Date: Jan. 30, 2014

(65) Prior Publication Data
US 2015/0212320 A1    Jul. 30, 2015

(30) Foreign Application Priority Data

Jul. 25, 2012  (EP) ..................... 12177877

(51) Int. Cl.
*G02B 27/01* (2006.01)
*B60R 1/00* (2006.01)

(52) U.S. Cl.
CPC .......... *G02B 27/0101* (2013.01); *B60R 1/001* (2013.01); *B60R 2300/205* (2013.01);
(Continued)

(58) Field of Classification Search
None
See application file for complete search history.

(56) References Cited

U.S. PATENT DOCUMENTS

| 8,018,450 | B2 | 9/2011 | Kimura et al. |
| 2004/0066547 | A1 | 4/2004 | Parker et al. |
| (Continued) | | | |

FOREIGN PATENT DOCUMENTS

| DE | 10 2006 013 140 A1 | 9/2007 |
| EP | 2 093 603 A1 | 8/2009 |
| (Continued) | | |

OTHER PUBLICATIONS

European Search Report in priority application No. 12177877.3 dated Apr. 8, 2013, 13 pages.
(Continued)

*Primary Examiner* — Kenneth B Lee, Jr.
(74) *Attorney, Agent, or Firm* — Foley & Lardner LLP

(57) ABSTRACT

A head-up display includes at least three light sources, each one arranged to emit light with a basic color different from the basic color of the other light sources, a digital micro mirror device including an array of micro mirrors, wherein the light of the light sources is directed onto the digital micro mirror device, at least one combiner for displaying an image, and at least one control unit for multiplexing the light sources so as to sequentially emit light thus creating a field sequential color system and for controlling the digital micro mirror device so as to selectively rotate the micro mirrors between an on state, where the light from the light sources is reflected into an optical path towards the combiner, and an off state, where the light is reflected away from that optical path. A method for operating the head-up display is also disclosed.

15 Claims, 1 Drawing Sheet

(52) U.S. Cl.
CPC ...... *G02B 27/01* (2013.01); *G02B 2027/0112* (2013.01); *G02B 2027/0118* (2013.01); *G02B 2027/0145* (2013.01); *G02B 2027/0156* (2013.01)

(56) References Cited

U.S. PATENT DOCUMENTS

| | | | |
|---|---|---|---|
| 2005/0012682 A1* | 1/2005 | Jenson | G02B 27/0101 345/7 |
| 2005/0200962 A1* | 9/2005 | Voloschenko | G02B 5/0278 359/630 |
| 2007/0279755 A1 | 12/2007 | Hitschmann et al. | |
| 2008/0285138 A1* | 11/2008 | Lebreton | B60K 35/00 359/630 |
| 2009/0213037 A1 | 8/2009 | Schon | |
| 2015/0130853 A1* | 5/2015 | Hada | H04N 9/3155 345/690 |

FOREIGN PATENT DOCUMENTS

| | | |
|---|---|---|
| JP | H0686110 A | 3/1994 |
| JP | H10-194009 A | 7/1998 |
| JP | H11-249062 A | 9/1999 |
| JP | 2005-070255 A | 3/2005 |
| JP | 2005-082103 A | 3/2005 |
| JP | 2006-069473 A | 3/2006 |
| JP | 2007-219125 A | 8/2007 |
| JP | 2008-164907 A | 7/2008 |
| JP | 2009-053517 A | 3/2009 |
| JP | 2009-282083 A | 12/2009 |
| JP | 2011-150099 A | 8/2011 |
| JP | 2012-003092 A | 1/2012 |
| WO | WO-2004/071074 A | 8/2004 |
| WO | WO-2006/013523 A2 | 2/2006 |
| WO | WO-2007/107515 A1 | 9/2007 |
| WO | WO-2008/075530 A1 | 6/2008 |
| WO | WO-2011/147501 A2 | 12/2011 |

OTHER PUBLICATIONS

International Search Report in PCT/EP2013/065584 dated Oct. 2, 2013, 6 pages.

Office Action dated Feb. 23, 2016, received in corresponding Japanese application No. 2015-523538 and English translation, 8 pages.

Office Action dated Nov. 1, 2016, received in corresponding Japanese Application No. 2015-523538 (3 pages) and English translation (2 pages).

* cited by examiner

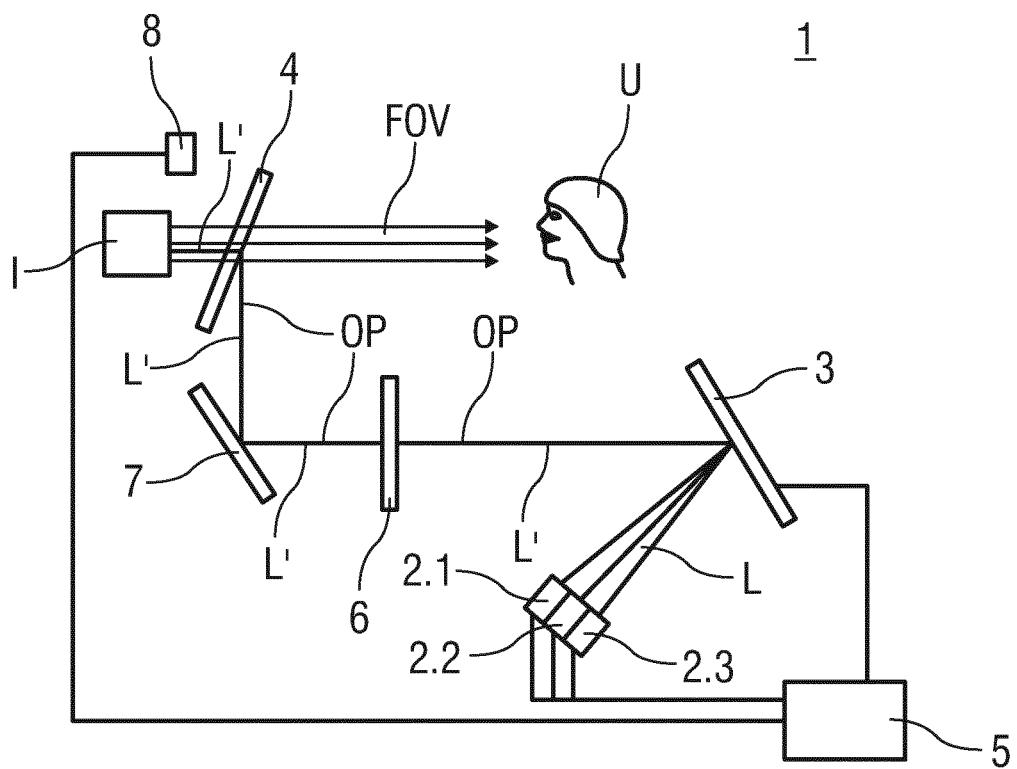

HEAD-UP DISPLAY AND METHOD FOR OPERATING IT

CROSS REFERENCE TO RELATED APPLICATIONS

The present application is a U.S. National Stage of International Application No. PCT/EP2013/065584 filed on Jul. 24, 2013, which claims the benefit of European Patent Application No. 12177877.3 filed on Jul. 25, 2012, the entire disclosures of all of which are incorporated herein by reference.

The invention relates to a head-up display and to a method for operating the head-up display.

Head-up displays are devices which transparently display information into a view field of a user, basically without obscuring the scene within that view field so that the user may remain focused on that scene and also acquire the displayed information. Head-up displays may for example be used in vehicles or aircraft.

Conventional head-up displays may comprise a thin film transistor (TFT) display, illuminated by a light source, which may comprise high power LEDs.

WO 2006/013523 A2 discloses a projection system including a light source, an imaging surface and a saturable absorber between the light source and the imaging surface. The projection system may be a scanning projection system. In another embodiment the projection system may include a light valve such as a liquid crystal panel.

WO 2008/075530 A1 discloses a head-up display device including a plurality of display means which emit visible lights, which are reflected towards a user by a combiner member, e.g. a wind shield, so as to form virtual images. The head-up display device includes a micro mirror device having a plurality of micro plane mirrors aligned in such a manner that each of the mirrors can move. The micro mirror device controls the visible lights emitted from the display means into a direction for forming the display images by adjusting the angle of the plane mirrors at a predetermined time interval or individually.

It is an object of the present invention to provide an improved head-up display and an improved method for operating the head-up display.

Preferred embodiments of the invention are given in the dependent claims.

According to the invention the head-up display comprises:
  at least three light sources, each one arranged to emit a basic color different from the basic color of the other light sources,
  a digital micro mirror device comprising an array of micro mirrors, wherein the light of the light sources is directed onto the digital micro mirror device,
  at least one combiner for displaying an image, and
  at least one control unit for multiplexing the light sources so as to sequentially emit light thus creating a field-sequential color system and for controlling the digital micro mirror device so as to selectively rotate the micro mirrors between an on state, where the light from the light sources is reflected into an optical path towards the combiner, and an off state, where the input light is reflected away from that optical path.

A method for operating a head-up display according to the invention comprises:
  multiplexing at least three light sources, each one arranged to emit a basic color different from the basic color of the other light sources, so as to sequentially emit light onto a digital micro mirror device (DMD) comprising an array of micro mirrors, thus creating a field-sequential color system,
  controlling the digital micro mirror device so as to selectively rotate the micro mirrors between an on state, where the light from the light sources is reflected into an optical path towards a combiner for displaying an image, and an off state, where the input light is reflected away from that optical path.

The light sources, e.g. LEDs are high speed controlled and multiplexed so as to sequentially emit light in order to sequentially display images in the respective basic color, e.g. red, green or blue, at such a rate that the inertia of the human vision creates the impression of a color picture mixed by the three colors. This approach is referred to as a field-sequential color system. Furthermore, the head-up display comprises the digital micro mirror device (DMD) comprising an array of micro mirrors corresponding to pixels of an image to be created.

As opposed to conventional head-up displays with TFT imaging, which typically have a low optical efficiency with TFT transmission rates in the range of 4% to 5%, the optical efficiency of the head-up display according to the invention is considerably increased. Digital micro mirror devices have an average optical efficiency of 50% to 60% allowing for global optical system efficiencies around 25%, thus dividing the need for the input optical power of the light sources by a factor of around 5 to 6. Lower input optical power results in lower thermal dissipation by the light source and hence reduced effort for cooling and reduced requirements to heat resistance of the components of the head-up display and surrounding components in the mounting location. The head-up display according to the invention also allows for higher contrast ratios and thus better readability in all ambient lighting conditions as well as greater image sizes.

An intermediate screen may be arranged in the optical path for shaping the light reflected from the digital micro mirror device so as to reproduce the image on the combiner. The intermediate screen may be adapted to transmit or reflect the light reflected from the digital micro mirror device.

The intermediate screen may comprise a polymer material, e.g. optical grade polycarbonate, cyclic olefin copolymer or cyclo-olefin polymer. Thus, a less expensive head-up display may be achieved as opposed to conventional head-up displays employing glass lenses for shaping the light.

The intermediate screen may comprise micro-structures for shaping the optical path. The micro-structures may comprise micro-optical lenses arranged in regular or random/stochastic patterns. Furthermore, the intermediate screen may comprise at least one coating.

In an embodiment of the invention at least one mirror may be arranged for folding the optical path. This allows for a compact design of the head-up display in complex installation situations.

The combiner and/or the mirror may be made of glass or of plastics, e.g. optical grade polycarbonate, cyclic olefin copolymer or cyclo-olefin polymer, in order to further reduce costs.

The combiner and/or the mirror may comprise/comprises an optically effective coating. The coating may be arranged for enhancing the reflectivity of the combiner and/or mirror in the visible spectrum. For example, the reflectivity may be enhanced from 20% to 95%, depending on the product type and the application.

The combiner may be a windshield of a vehicle or a separate transparent component arranged or arrangeable in the field of view of the user, e.g. a driver of the vehicle.

The head-up display may comprise one or more fixed combiners or one or more combiners with a mechanical tilt which may be manually operated by a user. Likewise, the head-up display may comprise one or more drive units or kinematic modules which may electrically, pneumatically or hydraulically move the combiner or mirror into and out of the field of view. This movement may be controlled by user operation and/or automatically, e.g. if important information such as engine problems, low oil or coolant pressure or level etc. are to be brought to the user's attention.

In an exemplary embodiment a sensor may be arranged for acquiring ambient light conditions, wherein the control unit is arranged to adapt a brightness of the image depending on the ambient light conditions.

The sensor may have a logarithmic sensitivity with a fine sensitivity in dark light conditions and a coarse sensitivity in bright ambient light. This allows for improving the adaption of the brightness of the head-up display.

The control unit may be arranged to adapt the brightness of the image by controlling a power of the light sources and/or by applying a pulse width modulation to the digital micro mirror device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a schematic view of a head-up display.

DETAILED DESCRIPTION OF PREFERRED EMBODIMENTS

FIG. 1 is a schematic view of a head-up display 1. The head-up display 1 comprises three light sources 2.1, 2.2., 2.3, each one arranged to emit light L in one of the basic colors red, green or blue, wherein the basic color of each light source 2.1, 2.2, 2.3 is different from the basic color of the others. Furthermore, the head-up display 1 comprises a digital micro mirror device 3 comprising an array of micro mirrors, wherein the light L of the light sources 2.1, 2.2, 2.3 is directed onto the digital micro mirror device 3. Moreover, the head-up display 1 comprises a combiner 4 for displaying an image I. A control unit 5 is arranged for multiplexing the light sources 2.1, 2.2, 2.3 so as to sequentially emit light L thus creating a field-sequential color system and for controlling the digital micro mirror device 3 so as to selectively rotate the micro mirrors between an on state, where the light L from the light sources 2.1, 2.2, 2.3 is reflected into an optical path OP towards the combiner 4 thus creating the image I, and an off state, where the input light L is reflected away from that optical path OP so that it is not displayed by the combiner 4. The combiner 4 is arranged in the field of view FOV of a user U, e.g. a driver of a vehicle or an operator of an aircraft.

The image I may be created in or on the combiner 4 or, as illustrated, reflected by the combiner 4 such that the user U perceives the image I at a distance behind the combiner 4. In this case the combiner 4, although basically transparent, is arranged as a mirror, however with a reflectance considerably below total reflection. The combiner may be flat, convex, concave or free-form.

An intermediate screen 6 is arranged in the optical path OP for shaping the light L' reflected from the digital micro mirror device 3. For this purpose, the intermediate screen 6 is shaped as a lens or comprises micro-structures (not illustrated) for shaping the light L' in the optical path OP so as to create the image I. The intermediate screen 6 may be made of or comprise glass or plastics, e.g. a polymer material. In the illustrated embodiment the intermediate screen 6 is adapted to transmit the light L' reflected from the digital micro mirror device 3. In an alternative embodiment (not illustrated) the intermediate screen 6 may be adapted to reflect the light L' reflected from the digital micro mirror device 3.

A mirror 7 is arranged for folding the optical path OP. In alternative embodiments the optical path OP may be folded by more than one mirror 7. The mirror 7 may be flat, concave or convex in order to adjust the size of the image I. The mirror 7 or at least one of the mirrors 7 may be arranged to be tilted (not illustrated) for adjusting the position of the image I within the field of view.

A sensor 8 is arranged for acquiring ambient light conditions, wherein the control unit 5 is arranged to adapt a brightness of the image I depending on the ambient light conditions. The sensor 8 may have a logarithmic sensitivity.

The brightness of the image I may be adapted by adjusting an input power of the light sources 2.1, 2.2, 2.3 thereby controlling the power of the emitted light L and/or by applying a pulse width modulation to the digital micro mirror device 3.

The combiner 4 and/or the mirror 7 may be made of plastics or glass and be equipped with an optically effective coating.

A drive unit or kinematic (not illustrated) may be arranged for selectively moving, e.g. folding the combiner 4 into or out of the field of view FOV.

In an exemplary embodiment the combiner 4 is a windshield of a vehicle.

LIST OF REFERENCES 1 head-up display
2.1 light source
2.2 light source
2.3 light source
3 digital micro mirror device
4 combiner
5 control unit
6 intermediate screen
7 mirror
8 sensor
FOV field of view
I image
L light
L' light
OP optical path
U user

The invention claimed is:

1. A head-up display comprising:
   at least three light sources, each one arranged to emit light with a basic color different from the basic color of the other light sources;
   a digital micro mirror device comprising an array of micro mirrors, wherein the light of the respective light sources directly enters the digital micro mirror device;
   at least one combiner for displaying an image; and
   at least one control unit for multiplexing the light so as to sequentially emit light thus creating a field-sequential color system and for controlling the digital micro mirror device so as to selectively rotate the micro mirrors between an on state, where the light from the light sources is reflected into an optical path towards the combiner, and an off state, where the light is reflected away from that optical path;
   wherein an intermediate screen is arranged in the optical path for shaping the light reflected from the digital micro mirror device.

2. A head-up display according to claim 1, wherein the intermediate screen comprises a polymer material.

3. A head-up display according to claim 1, wherein the intermediate screen comprises micro-structures for shaping the optical path.

4. A head-up display according to claim 1, wherein at least one mirror is arranged for folding the optical path.

5. A head-up display according to claim 4, wherein the combiner and/or the mirror comprise plastics.

6. A head-up display according to claim 4, wherein the combiner and/or the mirror comprise glass.

7. A head-up display according to claim 4, wherein the combiner and/or the mirror comprise an optically effective coating.

8. A head-up display according to claim 1, wherein the combiner is a transparent component arranged or arrangeable in the field of view of a user.

9. A head-up display according to claim 8, wherein a drive unit is arranged for selectively moving the combiner into or out of the field of view.

10. A head-up display according to claim 8, wherein the combiner is a windshield of a vehicle.

11. A head-up display according to claim 1, wherein a sensor is arranged for acquiring ambient light conditions, wherein the control unit is arranged to adapt a brightness of the image depending on the ambient light conditions.

12. A head-up display-according to claim 11, wherein the sensor has a logarithmic sensitivity.

13. A head-up display according claim 11, wherein the control unit is arranged to adapt the brightness of the image by controlling a power of the light sources and/or by applying a pulse width modulation to the digital micro mirror device.

14. A head-up display according to claim 1, wherein the intermediate screen is adapted to transmit or reflect the light reflected from the digital micro mirror device.

15. A method for operating a head-up display, the method comprising:
   multiplexing at least three light sources, each one arranged to emit light with a basic color different from the basic color of the other light sources, so as to sequentially emit light from the respective light sources to directly enter a digital micro mirror device comprising an array of micro mirrors, thus creating a field-sequential color system; and
   controlling the digital micro mirror device so as to selectively rotate the micro mirrors between an on state, where the light from the light sources is reflected into an optical path towards a combiner for displaying an image, and an off state, where the input light is reflected away from that optical path;
   wherein an intermediate screen is arranged for shaping the light reflected from the digital micro mirror device.

* * * * *